United States Patent
Nosaka

(10) Patent No.: US 8,456,543 B2
(45) Date of Patent: Jun. 4, 2013

(54) IMAGING DEVICE CAPABLE OF MANAGING MEMORY AREAS

(75) Inventor: Masafumi Nosaka, Osaka (JP)

(73) Assignee: Panasonic Corporation, Osaka (JP)

( * ) Notice: Subject to any disclaimer, the term of this patent is extended or adjusted under 35 U.S.C. 154(b) by 287 days.

(21) Appl. No.: 12/911,736

(22) Filed: Oct. 26, 2010

(65) Prior Publication Data

US 2011/0096198 A1    Apr. 28, 2011

(30) Foreign Application Priority Data

Oct. 27, 2009    (JP) .................................. 2009-246159

(51) Int. Cl.
*H04N 5/76*    (2006.01)

(52) U.S. Cl.
USPC .................................................... 348/231.99

(58) Field of Classification Search
USPC ................... 348/222.1, 231.99, 231.1–231.3, 348/231.6
See application file for complete search history.

(56) References Cited

U.S. PATENT DOCUMENTS

| | | | |
|---|---|---|---|
| 2003/0063316 A1* | 4/2003 | Irino | 358/1.16 |
| 2004/0170421 A1* | 9/2004 | Yoshizawa et al. | 396/310 |
| 2006/0279642 A1* | 12/2006 | Yoneda | 348/231.1 |
| 2007/0043962 A1* | 2/2007 | Misawa | 713/300 |
| 2008/0238949 A1* | 10/2008 | Shimaya | 345/684 |
| 2009/0121106 A1* | 5/2009 | An | 248/231.9 |

FOREIGN PATENT DOCUMENTS

JP    3065991 B2    7/2000

* cited by examiner

*Primary Examiner* — Gevell Selby

(74) *Attorney, Agent, or Firm* — Shinjyu Global IP

(57) ABSTRACT

An imaging device is provided with an internal memory and a controller. The internal memory includes a first area configured to hold device information about the imaging device and a second area configured to hold other information which can include demo data. At least one of the areas within the first area is capable of being defective. The controller is coupled to the internal memory to operate the internal memory to hold and move updated device information within the first area and/or within the second area according to the size of the non-defective areas within the first area.

26 Claims, 5 Drawing Sheets

IMAGING DEVICE CAPABLE OF MANAGING MEMORY AREAS

CROSS-REFERENCE TO RELATED APPLICATIONS

This application claims priority under 35 U.S.C. §119 to Japanese Patent Application No. 2009-246159 filed on Oct. 27, 2009. The entire disclosures of Japanese Patent Applications No. 2009-2009-246159 is hereby incorporated herein by reference.

BACKGROUND

1. Technical Field

The technology disclosed herein is related to an imaging device, and more particularly is related to an imaging device having an internal memory.

2. Background Information

The Japanese Patent No. 3,065,991 to Miyaoka et al. discloses a flash memory control device, comprising at least one flash memory that provides a memory area in which first data that is not to be rewritten is stored and a memory area in which second data that is to be rewritten is stored, computation processing means for rewriting the second data, and memory control means for switching between the memory area in which the first data is stored and the memory area in which the second data is stored, according to a switching command signal from the computation processing means.

SUMMARY

It has been discovered that when data held in the internal memory of an imaging device is repeatedly rewritten to the same internal memory, this action can lead to deterioration of the internal memory. Therefore, there is a high risk that important information held in the internal memory can be permanently lost. In view of the state of the known technology, one object of the technology disclosed herein is to provide an imaging device wherein important information held in its internal memory can be preserved for a longer time.

The imaging device comprises an internal memory and a controller. The internal memory includes a first area configured to hold device information about the imaging device and a second area configured to hold other information which can include demo data. At least one of the areas within the first area is capable of being defective. The controller is coupled to the internal memory to operate the internal memory to hold and move updated device information within the first area and/or within the second area according to the size of the non-defective areas within the first area.

BRIEF DESCRIPTION OF DRAWINGS

Referring now to the attached drawings, which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
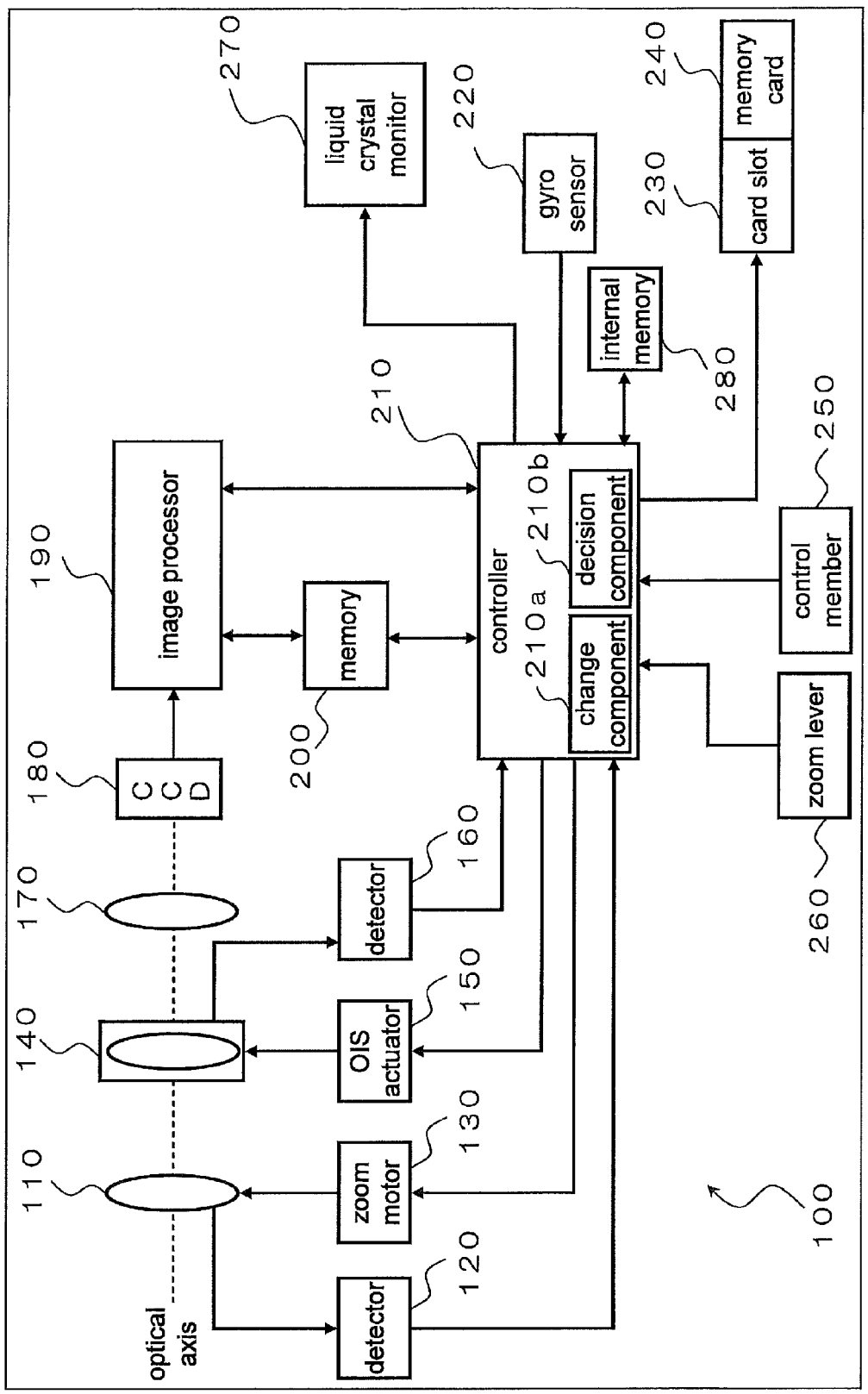
FIG. 1 is a block diagram of the configuration of a digital video camera.

Referring initially to FIG. 1, a digital video camera 100 is illustrated in accordance with a first embodiment of the present invention.

1-1. Overview

The digital video camera 100 in accordance with this embodiment has an internal memory 280. The internal memory 280 is a flash memory. Therefore, when data is rewritten numerous times within the same area in the internal memory 280, that area can become defective (or for example, inactive). With the digital video camera 100, the length of time that important information can be held in the internal memory 280 and preserved is longer than in the past.

1-2. Configuration

1-2-1. Electrical Configuration

The electrical configuration of the digital video camera 100 in accordance with this embodiment will be described through reference to FIG. 1. FIG. 1 is a block diagram of the configuration of the digital video camera 100. The digital video camera 100 uses a Charge Coupled Device (CCD) image sensor 180 to capture an image of a subject formed by an optical system composed of a zoom lens 110, etc. The image data produced by the CCD image sensor 180 is subjected to various kinds of processing by an image processor 190, and then held on a memory card 240. The image data held on the memory card 240 can be displayed on a liquid crystal monitor 270. The configuration of the digital video camera 100 will now be described in detail.

The optical system of the digital video camera 100 includes the zoom lens 110, an Optical Image Stabilizer (OIS) 140, and a focus lens 170. The zoom lens 110 can enlarge or reduce the subject image by moving along the optical axis of the optical system. The focus lens 170 adjusts the focus of the subject image by moving in the optical axis of the optical system. The OIS 140 has an internal correcting lens that is able to move within a plane perpendicular to the optical axis. The OIS 140 stabilizes the subject image by driving the correcting lens in the direction of canceling out shake of the digital video camera 100.

A zoom motor 130 drives and moves the zoom lens 110 along the optical axis. The zoom motor 130 can be a pulse motor, a DC motor, a linear motor, a servo motor, or the like. The zoom motor 130 can drive the zoom lens 110 via a mechanism such as, for example, a cam mechanism or a ball screw. A detector 120 detects where the zoom lens 110 is in the optical axis direction. The detector 120 outputs a signal in relation to the position of the zoom lens 110, by means of a brush or other such switch, according to the amount of movement of the zoom lens 110 in the direction of the optical axis.

An OIS actuator 150 drives and moves the correcting lens inside the OIS 140 within a plane that is perpendicular to the optical axis. The OIS actuator 150 can be a plane coil, an ultrasonic motor, or the like. A detector 160 detects the amount of movement of the correcting lens inside the OIS 140.

The CCD image sensor 180 captures a subject image formed by the optical system composed of the zoom lens 110, etc., and produces image data. The CCD image sensor 180 performs exposure, transfer, electronic shutter control, and various other operations.

The image processor 190 subjects the image data produced by the CCD image sensor 180 to various kinds of processing to produce image data for display on the liquid crystal monitor 270 or to produce image data to be put back in the memory card 240. For example, the image processor 190 subjects the image data produced by the CCD image sensor 180 to gamma correction, white balance correction, scratch correction, and so forth. The image processor 190 also compresses the image data produced by the CCD image sensor 180, using a compression format that conforms to the JPEG standard, the H.246 standard, or the like. The image processor 190 can be a DSP, a microprocessor, or the like.

A controller 210 is a control unit that controls the entire digital video camera 100. The controller 210 can be a semiconductor element or the like. The controller 210 can be comprised of only hardware or a combination of hardware and software. In this embodiment, the controller 210 is a microprocessor. The controller 210 reads and executes control programs held in the internal memory 280, and thereby operates as a change component 210a, a decision component 210b, etc. The operation of the change component 210a and the decision component 210b will be described in detail below.

A memory 200 functions as a working memory for the image processor 190 and the controller 210. The memory 200 can be, for example, DRAM, ferroelectric memory, or the like.

The liquid crystal monitor 270 is able to display an image corresponding to the image data produced by the CCD image sensor 180, an image corresponding to the image data read from the memory card 240, etc.

A gyro sensor 220 has a piezoelectric element or another such vibrating material. The gyro sensor 220 obtains angular velocity information by converting the Coriolis force exerted on the vibrating material, which is vibrated at a specific frequency, into voltage. The controller 210 obtains angular velocity information from the gyro sensor 220. The controller 210 then corrects any effect of shaking of the user's hand by driving the correcting lens inside the OIS 140 in the direction of canceling out the shake indicated by the angular velocity information.

The memory card 240 is removable from a card slot 230. The card slot 230 can be mechanically and electrically connected to the memory card 240. The memory card 240 includes an internal flash memory, ferroelectric memory, etc., and can hold data.

The internal memory 280 can be, for example, flash memory, ferroelectric memory, or another such nonvolatile memory. With the digital video camera 100 in this embodiment, the internal memory 280 is a flash memory. The internal memory 280 holds demo image data, control programs for controlling the entire digital video camera 100, and so forth. The internal memory 280 (e.g., flash memory) generally has a service life with a finite number of rewrites. Furthermore, as memory elements have increasingly become miniaturized, the upper limit for the number of rewrites tends to be lower. In this embodiment, the internal memory 280 is managed by the controller 210 and cannot be directly accessed by the user nor can the application of the internal memory 280 be decided by the user.

A control member 250 receives image capture commands from the user. A zoom lever 260 receives zoom ratio change commands from the user.

1-2-2. Configuration of Internal Memory

Figure 2:
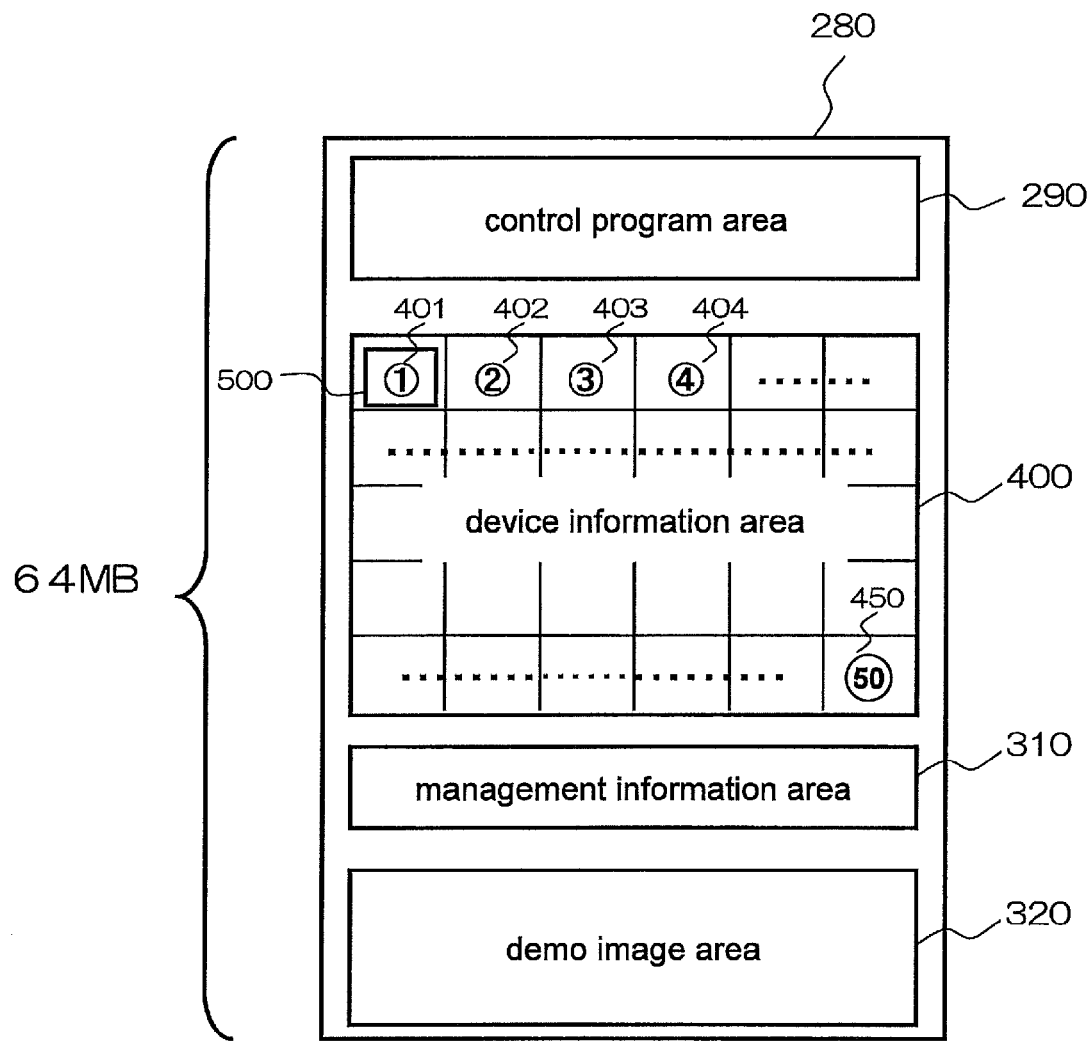
FIG. 2 is a block diagram of the configuration of an internal memory.

The internal memory 280 in accordance with this embodiment will be described through reference to FIG. 2. FIG. 2 is a block diagram of the configuration of the internal memory 280. The memory area of the internal memory 280 is managed in block units having a fixed length according to the characteristics of the flash memory being used. In this embodiment, the capacity of the entire internal memory 280 is 64 MB, and the unit block has a fixed length of 128 KB. However, it should be understood from this disclosure that various sizes can be used for the entire internal memory 280 and/or areas within the internal memory without departing from the scope of the present invention.

The internal memory 280 comprises a control program area 290, a device information area 400, a management information area 310, and a demo image area 320.

The control program area 290 is an area in which control programs for controlling the entire digital video camera 100 is held. Once stored, these control programs cannot be changed unless the version of the control programs updated. In this embodiment, the control program area 290 is 22 MB.

The device information area 400 is where the device information 500 is held. The device information area 400 has a capacity that allows multiple sets of device information 500 to be held. The device information area 400 is divided into subarea 401, subarea 402, ..., and subarea 450. In this embodiment, the device information 500 is held in subarea 401 in the initial state. The size of each of the subarea 401, the subarea 402, ..., and the subarea 450 is greater than the size of the device information 500, and of the multiples of the above-mentioned fixed length size, it is the smallest. In this embodiment, it is 256 KB. This depends on the size of the device information 500 discussed below.

Figure 3:
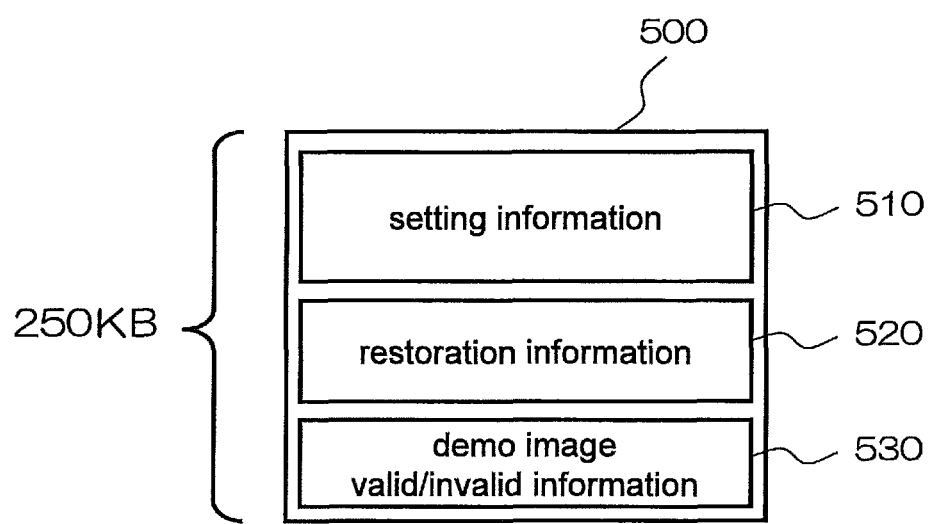
FIG. 3 is a schematic of a device information.

As shown in FIG. 3, the device information 500 is made up of setting information 510, restoration information 520, and demo image valid/invalid information 530 which is discussed below, and so forth. The setting information 510 is information that indicates setting parameters related to device settings of the digital video camera 100. These setting parameters can be, for example, changed on a setting menu screen displayed on the liquid crystal monitor 270 by the user's operating the control member 250. More specifically, the setting information 510 is information that indicates setting parameters that determine imaging conditions, image processing conditions, and the like. The restoration information 520 is information that indicates attributes (such as the file name, a pointer indicating the file start position, or the file size) of a data file of a moving picture image stored in the memory card 240 in real time during moving picture recording. The restoration information 520 is updated periodically during moving picture recording. The device information 500 has a fixed length, which is 250 KB in this embodiment. The device information 500 is held in the memory 200 during the use of the digital video camera 100. The device information 500 is continuously changed during use of the digital video camera 100. However, the device information 500 must be nonvolatile in the event the power is shut off. Therefore, the device information 500 is stored in the device information area 400 within the internal memory 280.

For example, let us consider a case in which the user wishes to change the characteristics of the OIS actuator 150 through the control member 250. Here, the controller 210 changes the device settings of the digital video camera 100 as directed by the control member 250. More specifically, the controller 210 changes the setting parameters related to the characteristics of the OIS actuator 150 included in the setting information 510 of the device information 500 inside the memory 200, as directed by the control member 250. Further, the controller 210 simultaneously updates the setting information 510 of the device information 500 located within the device information area 400. Consequently, even if the power is shut off after the settings have been changed (more precisely, after the setting information 510 in the device information area 400 has been updated), the result of user operation is stored in the digital video camera 100. Also, during moving picture recording, the controller 210 updates the restoration information 520 of the device information 500 located within the device information area 400 at specific time intervals. If the power is cut off to the digital video camera 100 during moving picture recording, and then the power is turned back on, the controller 210 refers to the restoration information 520 read from the device information area 400, and thereby quickly restores the data file of the moving picture image stored on the memory card 240. More specifically, the controller 210 performs subsequent file management so that data of the file size indicated by the restoration information 520, starting from the starting position indicated by the restoration information 520, is treated as a data file of the file name indicated by the restoration information 520. The data file of the moving picture image restored by this restoration processing is a data file of the moving picture image up to the point that the restoration information 520 in the device information area 400 was last updated prior to the power cutoff. Even if the power is forcibly shut off during moving picture recording, the restoration information 520 within the device information area 400 allows the incomplete data file of the moving picture image in the memory card 240 to be quickly restored.

The management information area 310 stores management information for managing the state of the subareas 401 to 450 of the device information area 400. More specifically, the management information area 310 stores information relating to which of the subareas 400 to 450 were decided in the past to be defective. This "information relating to which of the subareas 400 to 450 were decided in the past to be defective" is dead/alive information about the subareas 400 to 450. Also, the management information area 310 stores information about the latest device information 500 held in the subareas 400 to 450 is. This "information about the latest device information 500 held in the subareas 400 to 450" is information that indicates the area number (address) of the area containing the latest device information 500.

Therefore, the controller 210 updates the management information in the management information area 310 when the device information 500 is put in the device information area 400 (i.e., when the device information 500 in the device information area 400 is updated). The controller 210 refers to the management information and treats any areas decided in the past to be defective as defective areas (or for example, inactive subareas). In this embodiment, the combined size of the size of the device information area 400 and the size of the management information area 310 is 35 MB.

The demo image area 320 holds demo image data intended to be used as sales promotions in a store. After being put in the demo image area 320, the demo image data does not change unless the version of the demo image data is updated. The demo image data held in the demo image area 320 has undergone JPEG compression. The demo image data held in the demo image area 320 goes through the controller 210, is expanded by the image processor 190 and is displayed as video on the liquid crystal monitor 270. Regardless of whether the demo image data held in the demo image area 320 is valid or not, the demo image data is managed by the demo image valid/invalid information 530 of the device information 500. If the demo image valid/invalid information 530 indicates that the demo image data is valid, the controller 210 can read the demo image data from the demo image area 320 and reproduce the demo image data on the liquid crystal monitor 270. On the other hand, if the demo image valid/invalid information 530 indicates that the demo image data is invalid, the controller 210 does not read the demo image data from the demo image area 320. In this embodiment, the demo image area 320 is 5 MB in size.

1-2-3. Operation of the Internal Memory

The internal memory 280 is an example of the internal memory of the present invention. The controller 210 is an example of the controller of the present invention.

1-3. Updating the Device Information 500 in Device Information Area 400

When the power supply is turned on, the digital video camera 100 starts operating. At this point, the controller 210 refers to the management information area 310 and copies the latest device information 500 held in the device information area 400 of the memory 200. The copied device information 500 is referred to by the controller 210 and used in the various device settings of the digital video camera 100 and, as needed, in the restoration of data files for moving picture images. The updating of the device information 500 located in the device information area 400 during a subsequent steady state after initialization of the digital video camera 100 will be described through reference to FIG. 4.

After the device information 500 is copied to the memory 200, etc., initialization of the digital video camera 100, which is a process immediately after the power is turned on, ends. After the initialization ends, the digital video camera 100 enters a steady state (S100). Once the digital video camera 100 enters a steady state, the controller 210 goes into standby mode until a command to rewrite the above-mentioned device information 500 (S110) is issued. The command to rewrite is issued as a result of a change to the device settings of the digital video camera 100 by the user or by the elapse of a specific length of time that is the update interval for the restoration information 520 during moving picture recording.

If a command to rewrite the device information 500 is issued, the decision component 210*b* acquires information about the latest device information 500 stored within the subareas 401 to 450 of the device information area 400 (S120). More specifically, the decision component 210*b* refers to the management information area 310 to decide an area number of the area in which the latest device information 500 is held. The decision component 210*b* then assigns (or labels) this area number as area number N.

When the area number N is acquired, the decision component 210*b* decides the area number for the next area after the area assigned to area number N (S130). The decision component 210*b* assigns (or labels) the decided area number for the next area to area number M. In particular, the area number M is obtained by adding 1 to the area number N. If, however, the result of adding 1 to the area number N is greater than the maximum value of the area numbers for the areas provided for holding the device information 500 in the internal memory 280, then the minimum value (the area number of the subarea 401) of the area numbers for the areas provided for holding the device information 500 in the internal memory 280 is assigned to the area number M. The area numbers for the areas provided for holding the device information 500 in the internal memory 280 are registered in the management information area 310. The initial value is the area number group of the areas 401 to 450.

When the area number M is determined, the decision component 210b decides whether or not M=N (S140). In step S140, immediately following steps S120 and S130, the decision result is always M≠N.

When it is decided that M≠N, the decision component 210b refers to the management information area 310 to decide whether or not the area of the area number M is defective (S150).

If the decision component 210b decides that the area of the area number M is not defective, then the change component 210a places a new device information 500 in the area assigned to area number M (S160). On the other hand, if the decision component 210b decides that the area assigned to area number M is defective, the flow proceeds to step S200 (discussed below).

After step S160, the decision component 210b decides whether or not the device information 500 was successfully placed in the area designated as area number M (S170). In other words, step S170 decides whether or not the area designated as area number M is defective.

If the decision component 210b has decided that the device information 500 has been successfully placed in the area designated as area number M, the change component 210a updates the management information in the management information area 310 (S180). More specifically, when the decision component 210b has decided that the device information 500 has been successfully placed in the area designated as area number M, the change component 210a stores the fact that the area number of the area in which the latest device information 500 is held in the device information area 400 is M (S180). When the management information in the management information area 310 is updated, an update of the device information 500 in the device information area 400 ends once. After this, the controller 210 goes into standby mode until a command to rewrite the device information 500 is issued again (S110).

Meanwhile, if the decision component 210b has decided that the device information 500 has not been placed in the area designated as area number M, the decision component 210b updates the management information in the management information area 310 (S190). More specifically, when the decision component 210b has decided that the device information 500 has not been placed in the area designated as area number M, the decision component 210b stores the fact that the area designated as area number M is defective (S190). When the management information in the management information area 310 is updated, the decision component 210b assigns M+1, which is the area number for the next area located after the area designated as area number M, to the new area number M (S200). In particular, a new area number M is obtained by adding 1 to the previous area number M. However, if the result of adding 1 to the previous area number M is greater than the maximum value of the area numbers for the areas provided for holding the device information 500 in the internal memory 280, then the minimum value (the area number of the area 401) of the area numbers for the areas provided for holding the device information 500 in the internal memory 280 is assigned to the new area number M. The area numbers for the areas provided for holding the device information 500 in the internal memory 280 are decided by referring to the management information area 310. After M+1 is assigned to the new area number M, the decision component 210b decides whether or not M=N (S140).

Next, we will describe a case in which the decision component 210b decides in step S140 that M=N. Of the areas provided for holding the device information 500 in the internal memory 280, if all are defective except for the area in which the latest device information 500 (the area of the area number N) is held, then the condition of M=N is met in step S140.

If it is determined that M=N, the decision component 210b refers to the demo image valid/invalid information 530 to decide whether or not the demo image data is valid (S300).

If it has been determined that the demo image data is already invalid, the decision component 210b decides that the digital video camera 100 has malfunctioned. The decision component 210b then shuts of the power to the digital video camera 100 (S320).

On the other hand, if it is decided that the demo image data is valid, the decision component 210b invalidates the demo image data. Also, as shown in FIG. 5, the decision component 210b provides the demo image area 320 as a new area for holding the device information 500 (S310). More specifically, the decision component 210b registers information in the management information area 310 indicating that subareas 451 to 480 of the demo image area 320 are provided as new areas for holding the device information 500. After this, the decision component 210b deletes the demo image data from the demo image area 320. Also, the decision component 210b changes the demo image valid/invalid information 530 of the device information 500 in the internal memory 280 to indicate that the demo image data is invalid. Thereafter, the loop between steps S140 and 5200 shown in FIG. 4 is repeated so that the controller 210 can place the device information 500 in the subareas 451 to 480 as well.

Step S160 is executed when M≠N, i.e., in a situation in which the area number M of the area that holds the new device information 500 is different from the area number N of the area that currently holds the latest device information 500. Also, step S160 stores the new device information 500 in the area designated as area number M. Thus, in step S160 the latest device information 500 is changed from the area designated as area number N to the area designated as area number M.

In step S140, the condition M=N is met when the size of the subarea remaining in the device information area 400, which is an area capable of holding the device information 500 (except for the subarea in which the latest device information 500 is held), is zero. In this embodiment, the "subarea remaining in the device information area 400 which is an area capable of holding the device information 500" is the area that is not registered as defective in the management information area 310 out of all the areas provided for holding the device information 500. In other words, in step S140 the decision component 201b decides whether or not the size of the subarea remaining in the device information area 400 which is an area capable of holding the device information 500 (except for the subarea in which the latest device information 500 is held) is less than or equal to a specific amount (zero in this embodiment). Also, step S140 is a step that leads to step S310 in which the demo image area 320 is changed from an area for holding demo image data into subareas for holding the device information 500, if the size described above is less than or equal to the specific amount. Therefore, all of the steps S120, S130, S140, S150, and S200 are used to decide whether to change (or move) the device information 500 between subareas within the device information area 400 and/or subareas within the demo image area 320 which corresponds to the size of the subarea remaining in the device information area 400 which is the area capable of holding the device information 500. Also, step S310 is a step when it has been decided to change the area (or subareas) for holding the device information 500 to subareas within the demo image area 320.

Figure 4:
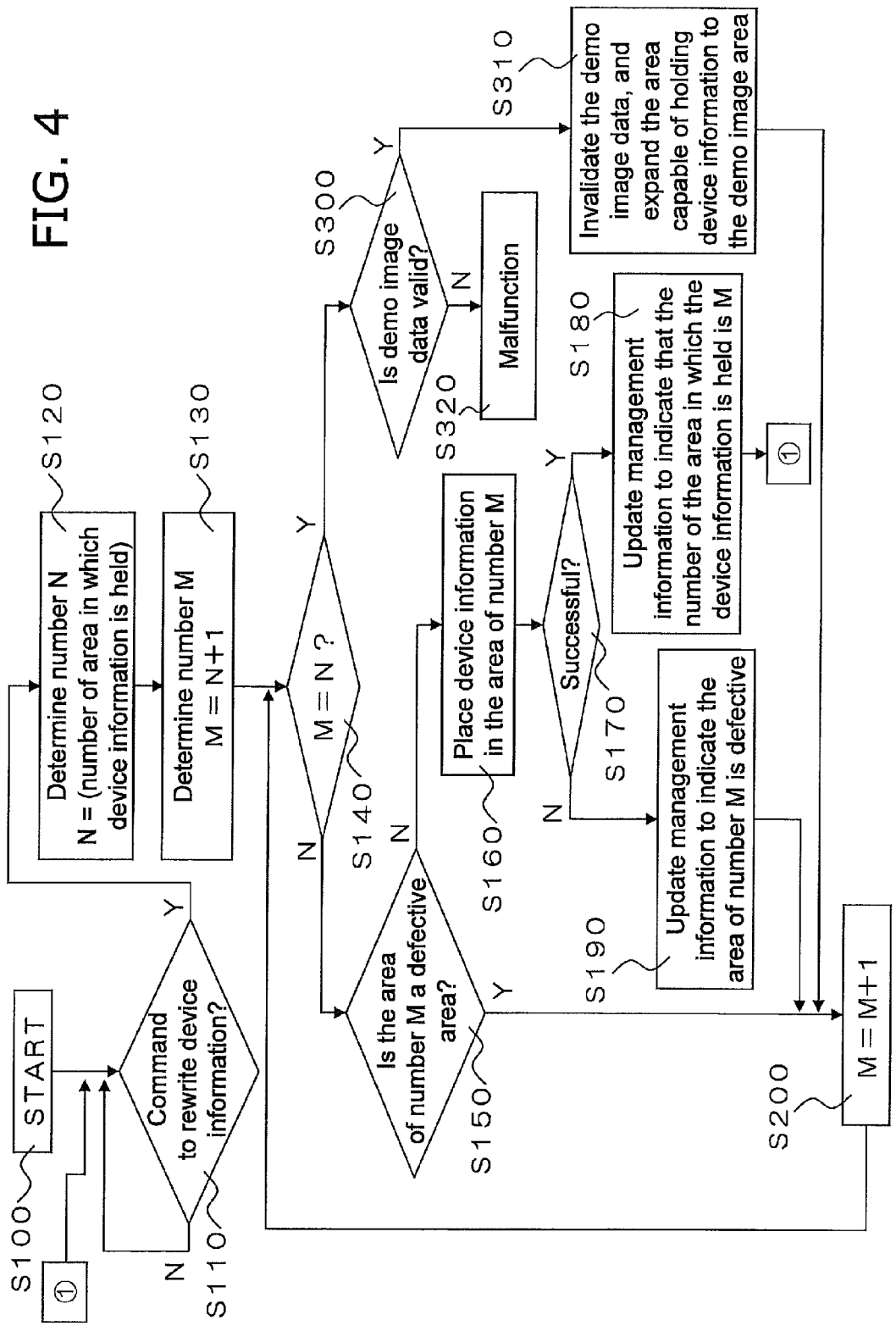
FIG. 4 is a flowchart of update processing performed on a device information.
Figure 5:
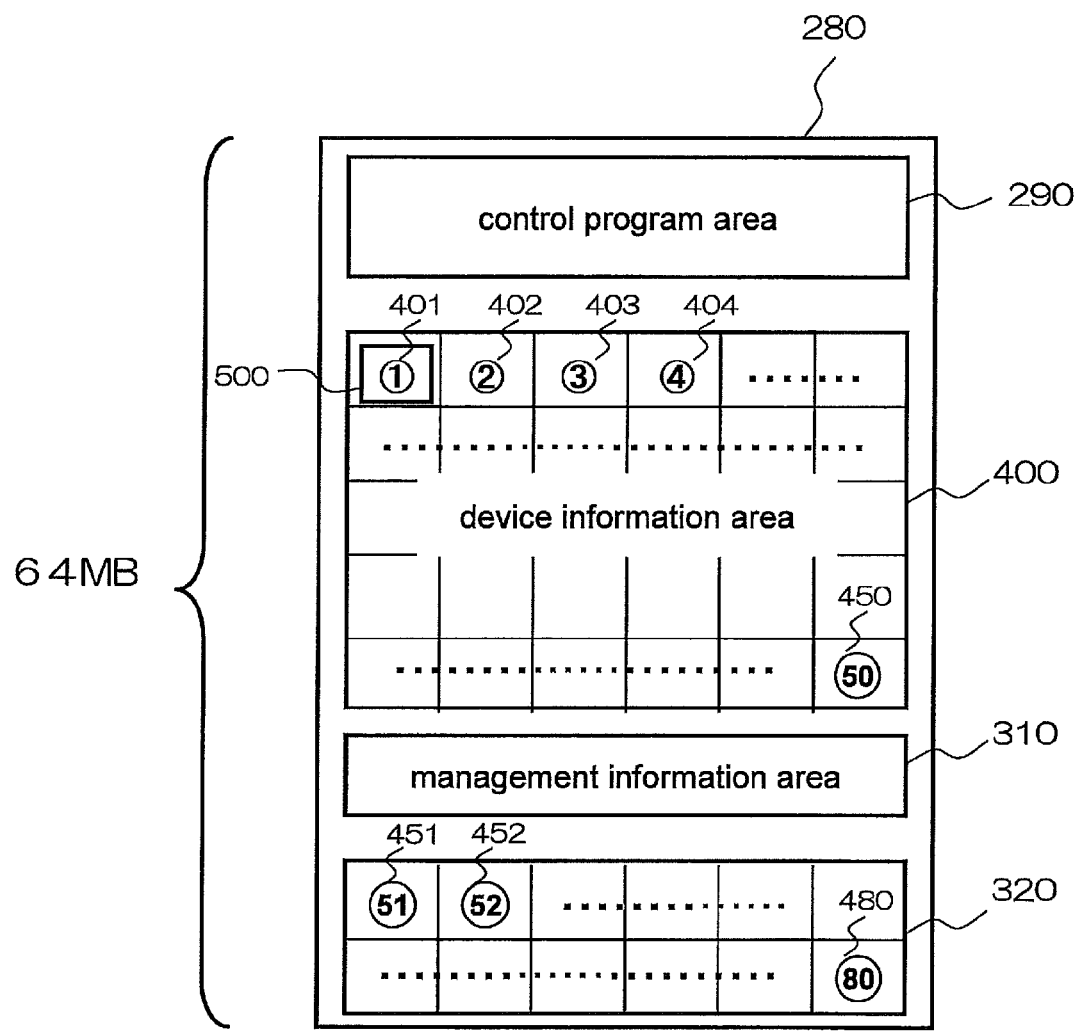
FIG. 5 is a block diagram of the configuration of an internal memory.

Therefore, the process shown in FIG. 4 involves changing the area in which the device information 500 is held within the device information area 400, or within an area including the demo image area 320, according to the size of the area remaining in the device information area 400 as the area capable of holding the device information 500. From a different standpoint, the processing pertaining to the flowchart in FIG. 4 involves newly providing the demo image area 320 as the area for holding the device information 500 when the size of the area remaining in the device information area 400 as the area capable of holding the device information 500 is reduced.

Thus, in accordance with the digital video camera 100 of this embodiment, when the device information 500 can no longer be written to the areas (subareas) within the range (i.e., the size) of the device information area 400, the device information 500 is written to areas (subareas) in the demo image area 320. As a result, the digital video camera 100 will not malfunction right away, even if all the areas in the device information area 400 are defective.

We will now describe a case in which the user chooses to reproduce a demo image after the demo image area 320 has become invalid. In this case, the controller 210 controls the liquid crystal monitor 270 so as to display that an error has occurred in the demo image data. Also, in this embodiment the user cannot directly instruct the digital video camera 100 to delete the demo image data in the demo image area 320. Therefore, the demo image data is deleted without the user's knowledge by execution of step S310.

Other Embodiments

While the first embodiment has been chosen to illustrate a preferred embodiment of the present invention, it will be apparent to those skilled in the art from this disclosure that various changes and modifications can be made herein without departing from the scope of the invention.

For instance, the optical system and drive system of the digital video camera 100 in accordance with this other embodiment is not limited to the device shown in FIG. 1. For instance, FIG. 1 shows an example of an optical system made up of three groups. However, the lens group can have a different configuration. Also, each of the lenses can consist of a single lens or a lens group made up of a plurality of lenses.

Also, the CCD image sensor 180 discussed in the first embodiment was used as an example of an imaging means, but the present invention is not limited to this. For example, a CCD image sensor or a CMOS image sensor can be used as an imaging means.

Also, in the first embodiment an example was given in which all the demo image data was invalidated all at once, and the entire demo image area 320 was changed to an area for holding the device information 500. However, there are other options. For example, the demo image data can be invalidated a little at a time, and the area for holding the device information 500 can be gradually increased in the demo image area 320.

Also, in the first embodiment an example was given in which the demo image data in the demo image area 320 was invalidated when the area capable of holding the device information 500 (except for the area in which the latest device information 500 is held) is no longer within the device information area 400. However, there are other options. For example, the constitution can be such that the demo image data in the demo image area 320 is invalidated when the amount of the defective area in the device information area 400 gets more than or equal to a specific amount (e.g., a majority of the area such as 70 or 80 percent).

Also, in the first embodiment, during updating of the device information 500 in the device information area 400, it is decided (step S140, etc.) whether to change the device information 500 between subareas within the device information area 400 or between subareas within the demo image area 320. And if the latter is chosen, the demo image area 320 is changed from an area for holding demo image data into an area for holding the device information 500 (step S310). However, the timing at which this processing is executed by the decision component 210b is not limited to first embodiment discussed above. For example, deciding whether to change the device information 500 between subareas can be performed independently of updating the device information 500. Likewise, the decision to change the device information 500 between subareas can be executed periodically or when the power to the digital video camera 100 is either turned on or turned off.

Also, in the first embodiment, demo video data was given as an example of demo data, but this is not the only option. For example, the demo data can be demo audio data, demo music data, or demo still picture data. These can also be combined.

Industrial Applicability

The technology disclosed herein can be applied to a digital video camera, a digital still camera, or another such electronic device.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of an imaging device and/or internal memory. Accordingly, these terms, as utilized to describe the above embodiments should be interpreted relative to an imaging device and/or internal memory.

Moreover, the term "configured" as used herein to describe a component, section, or part of a device includes hardware and/or software that is constructed and/or programmed to carry out the desired function.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An imaging device comprising:
an internal memory including a first area configured to store device information about the imaging device, at least one of a plurality of areas within the first area capable of being defective, and a second area configured to store information including non device information; and
a controller operatively coupled to the internal memory, configured to:
operate the internal memory; and
expand an area within the first area to include at least a portion of the second area such that both of the first area and the portion of the second area include device information once the device information is updated, if the size of at least one of the non defective areas within the first area is smaller than a predetermined size.

2. The imaging device according to claim 1, wherein the first area is a device information area and the second area includes a demo data area.

3. The imaging device according to claim 1, wherein
the device information includes setting information that relates to setting parameters of the imaging device which are managed by a user, and
the controller is further configured to operate the internal memory to move the device information between the first area and/or the second area when the setting information is updated.

4. The imaging device according to claim 1, wherein
the device information includes restoration information that relates to attributes of a data file for a moving picture, and
the controller is further configured to operate the internal memory to move the device information between the first area and/or the second area when the restoration information is periodically updated during moving picture recording.

5. The imaging device according to claim 1, wherein
the controller is further configured to operate the internal memory to delete at least part of the other information from the second area according to the size of the non-defective areas within the device information area.

6. The imaging device according to claim 1, wherein
the controller is further configured to operate the internal memory to store and move updated device information within the first area and/or the second area according to the size of the only non-defective area within the first area.

7. The imaging device according to claim 6, wherein
the controller is further configured to operate the internal memory to delete at least part of the other information from the second area according to the size of the only non-defective area within the first area.

8. The imaging device according to claim 1, wherein
the controller recognizes the first area and the second area as a united area, if the size of at least one of the areas within the first area is smaller than the predetermined size.

9. The imaging device according to claim 8, wherein
the controller does not store the non device information and stores the updated device information within the second area of the united area, if the size of at least one of the areas within the first area is smaller than the predetermined size.

10. The imaging device according to claim 9, further comprising:
an operation unit configured to receive operation commands from the user; and
wherein the controller stores the updated device information within the second area of the united area, if the operation unit receives a command to update the device information and the size of at least one of the areas within the first area is smaller than the predetermined size.

11. An imaging device, comprising:
an internal memory including a device information area configured to store device information about the imaging device, and a non device information area configured to store non device information; and
a controller operatively coupled to the internal memory, configured to:
operate the internal memory; and
expand an area within the first area to include at least a portion of the second area such that both of the first area and the portion of the second area include device information once the device information is updated, if the size of at least one of the non defective areas within the first area is smaller than a predetermined size.

12. The imaging device according to claim 11, wherein
the device information includes setting information indicating setting parameters related to device settings for the imaging device that can be set by a user, and
the controller changes the area in which the device information is held when the setting information is updated through a change operation by the user.

13. The imaging device according to claim 11, wherein
the device information includes restoration information indicating attributes of a data file of a moving picture, and
the controller changes the area in which the device information is held when the restoration information is periodically updated during moving picture recording.

14. The imaging device according to claim 11, wherein
the controller deletes at least part of the demo data from the demo data area according to the size of the area remaining in the device information area as the area capable of storing the device information.

15. The imaging device according to claim 11, wherein
the controller recognizes the device information area and the non device information area as a new device information area, if the size of the area remaining in the device information area is smaller than the predetermined size.

16. The imaging device according to claim 15, wherein
the controller does not store the non device information and stores the updated device information within the non device information area of the new device information area, if the size of an area remaining in the device information area is smaller than the predetermined size.

17. The imaging device according to claim 16, further comprising:
an operation unit configured to receive operation commands from the user; and
wherein the controller stores the updated device information within the non device information area of the new device information area, if the operation unit receives a command to update the device information and the size of an area remaining in the device information area is smaller than the predetermined size.

18. An imaging device comprising:
an internal memory including:
- a device information area configured to store device information about the imaging device, the device information area including a plurality of active subareas, at least one of the active subareas capable of being an inactive subarea; and
- a non device information area including a plurality of active subareas, a plurality of the active subareas configured to store non device information; and
- a controller operatively coupled to the internal memory, configured to:
  operate the internal memory; and
  expand an active subarea of the device information area to include at least a portion an active subarea of the non device information area such that both the device information area, and the portion of the active subarea of the non device information include device information once the device information is updated, if the size of at least one of the non defective areas within the first area is smaller than a predetermined size.

19. The imaging device according to claim 18, wherein the device information includes setting information that relates to setting parameters of the imaging device which are managed by a user, and
the controller is further configured to operate the internal memory to move the device information between the active subareas when the setting information is updated.

20. The imaging device according to claim 18, wherein the device information includes restoration information that relates to attributes of a data file for a moving picture, and
the controller is further configured to operate the internal memory to move the device information between the active subareas when the restoration information is periodically updated during moving picture recording.

21. The imaging device according to claim 18, wherein the controller is further configured to operate the internal memory to delete at least part of the demo data from the demo data area according to the size of the active subareas within the device information area.

22. The imaging device according to claim 18, wherein the controller is further configured to operate the internal memory to store and selectively move updated device information between the active subareas within the device information area and/or the active subareas within the demo data area according to the size of the only active subarea within the device information area.

23. The imaging device according to claim 22, wherein the controller is further configured to operate the internal memory to delete at least part of the demo data from the demo data area according to the size of the only active subarea within the device information area.

24. The imaging device according to claim 18, wherein the controller recognizes the device information area and the non device information area as a new device information area, if the size of the active subareas within the device information area is smaller than the predetermined size.

25. The imaging device according to claim 24, wherein the controller doesn't store the non device information and stores the updated device information within the active subareas of the non device information area in the new device information area, if the size of the active subareas within the device information area is smaller than the predetermined size.

26. The imaging device according to claim 25, further comprising:
an operation unit configured to receive operation commands from the user; and
wherein the controller stores the updated device information within the active subareas of the non device information area in the new device information area, if the operation unit receives a command to update the device information and the size of the active subareas within the device information area is smaller than the predetermined size.

* * * * *